United States Patent [19]

DeBarber et al.

[11] Patent Number: 5,220,969
[45] Date of Patent: Jun. 22, 1993

[54] SCALE HAVING VARIABLE THICKNESS DOCUMENT FEED BELT

[75] Inventors: Christopher DeBarber, Woodbury; Gerald C. Freeman, Norwalk, both of Conn.

[73] Assignee: Pitney Bowes Inc., Stamford, Conn.

[21] Appl. No.: 923,407

[22] Filed: Jul. 31, 1992

[51] Int. Cl.⁵ .................... G01G 19/00; B65G 37/00
[52] U.S. Cl. ...................................... 177/145; 198/372
[58] Field of Search .......................... 198/372; 177/145

[56] References Cited

U.S. PATENT DOCUMENTS

| 3,104,004 | 9/1963 | Poel et al. | 198/372 |
| 3,180,475 | 4/1965 | Rosso | 177/145 |
| 4,200,178 | 4/1980 | Gunti | 198/372 |

Primary Examiner—Benjamin R. Fuller
Assistant Examiner—Randy W. Gibson
Attorney, Agent, or Firm—Robert H. Whisker; Melvin J. Scolnick

[57] ABSTRACT

A transport apparatus for a weighing module includes a scale which has a deck connected to a scale base for weighing an object placed on the deck. The deck has slots for accommodating dual thickness belts which are arranged below the deck to be in substantial registration with the slots. The belts are positioned with respect to the slot such that in a home position a thinner section of the belt does not protrude through the slot whereby the transport means does not interfere with weighing of the object on the deck. When the belts are actuated, the dual thickness belts move so that a thicker section of each belt protrudes through the slot as the belts are being driven to thereby lift the object from the deck onto the thicker section of the belt to transport the object on the belt. In a particular embodiment, the thicker section comprises lugs which include initial tapered transition lugs to assure lifting of the object.

12 Claims, 4 Drawing Sheets

SCALE HAVING VARIABLE THICKNESS DOCUMENT FEED BELT

FIELD OF THE INVENTION

The invention relates to scales and more particularly to scales having associated transport means for transporting a document or mailpiece.

BACKGROUND OF THE INVENTION

Weighing modules for use in conjunction with electronic postage meters are well known. The modules receive mailpieces and weigh them to derive a signal for setting the postage meter value to print the required amount of postage for a given weight mailpiece. When the weighing module is a part of a complete system, the speed with which the scale can weigh and transport mailpieces becomes a very important criterion for rating the system. The known methods of transport of mailpieces from the scale platform have become more and more complex as the need to reduce the tare weight to reduce susceptibility to vibration and at the same time addressing the need to increase the efficiency of mailpiece throughput are confronted.

In order to transport the mailpiece, it is known, for example from U.S. Pat. No. 4,742,878, to weigh the mailpiece while it is resting on transport belts. While this can work well, the weight of the belts and rollers increases the tare of the scale and can make the scale more susceptible to ground vibration. U.S. Pat. No. 3,904,946 teaches a transport apparatus in which the mailpiece is stopped for weighing between a pair of driven pincer rollers which are then brought together to trap the mailpiece in the nip between them to transport the mailpiece after it has been weighed.

U.S. Pat. No. 3,885,783 teaches a document feeder in which a belt having a plurality of resilient fingers on a portion of its outer periphery is used to intermittently advance a top document from a stack of documents resting on edge. U.S. Pat. No. 1,703,148 shows a mail marking machine in which a belt passes around the periphery of a pair of pulleys such that a mailpiece travels in contact with the belt between the pulleys is transported in conventional manner from a supply to a mail stacker. U.S. Pat. No. 3,506,258 describes a system for feeding documents edgewise by use of rollers having friction shoes which extend only part way around the periphery of the rollers. The portions of the rollers with the friction shoes are arranged so as not to engage the next document until the end of the first document has passed completely over all the rollers.

SUMMARY OF THE INVENTION

It is an object of the invention to provide a scale having a mailpiece transport apparatus which eliminates the need for raising and lowering the transport mechanism to transport a mailpiece from a scale platform.

It is another object to provide a scale having a transport system which is not part of the tare of the scale.

It is yet another object of the invention to provide a simplified belt transport for a weighing module which will not interfere with the weighing operation and will thereafter lift the mailpiece from a deck and transport it to the next module.

These and other objects may be accomplished by providing a transport apparatus for a scale, the scale comprising a deck connected to a weighing mechanism for weighing an object placed on the deck, said deck having at least one slot therein; the transport apparatus comprising a dual thickness belt arranged below said deck in substantial registration with the slot and means for driving said belt, said belt being positioned with respect to the slot such that in a home position a thinner section of the belt does not protrude through the slot whereby the belt does not interfere with weighing of the object on said deck, said means for driving said belt being operative to drive said dual thickness belt such that a thicker section of the belt protrudes through said slot as said dual thickness belt is being driven to thereby lift the object from the deck onto said thicker section of the belt to transport the object on the belt.

In another aspect of the invention there is provided a method for transporting a mailpiece from a scale deck comprising the steps of providing a plurality of slots in the deck; providing a corresponding plurality of driven dual thickness belts below said deck and in substantial registration, respectively, with the slots; weighing the mailpiece while the thinner sections of the belts are in a position wherein the belts do not protrude through the slots and thereby do not interfere with the weighing step; and thereafter actuating the belts to move such that the thicker portion protrudes through the slots to lift the mailpiece and transport it as the belts move.

DESCRIPTION OF THE PREFERRED EMBODIMENT

Figure 1:
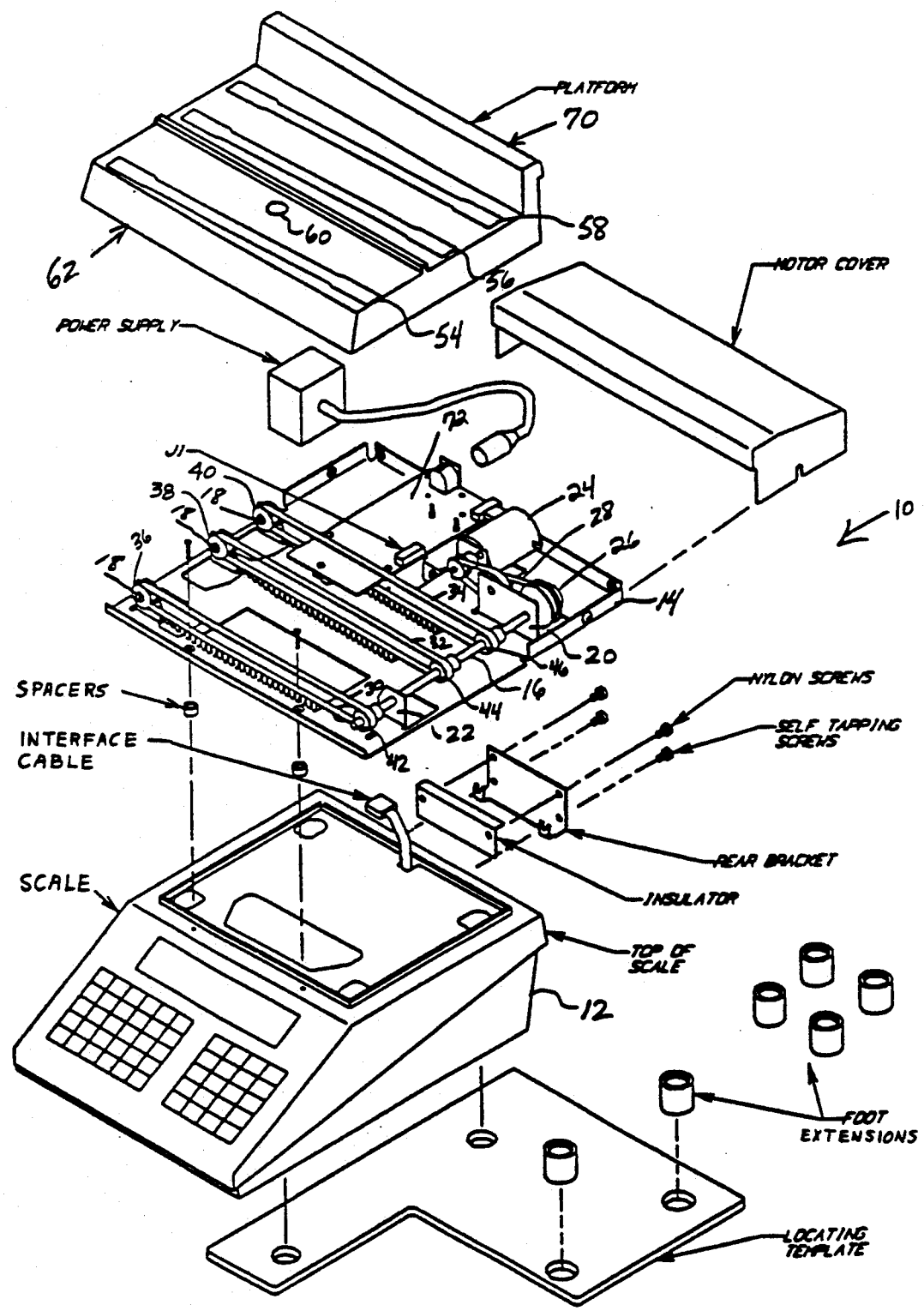
FIG. 1 is an exploded perspective view of a scale and a transport system in accordance with the invention.

In FIG. 1, there is shown generally at 10 in an exploded perspective view, a weighing module which includes a scale comprising base unit 12 on which belt transport assembly frame 14 is mounted using suitable known fasteners such as screws. Shaft 16 is mounted on flanges 20 and 22 at one side of the frame and studs 18 are mounted in flanges (not easily visible) on the other side. DC motor 24 is mounted for driving pulley 26 affixed to shaft 16 through timing belt 28. It will be appreciated that the drive may be accomplished by means of gears or other known drive transmission devices if desired. In the preferred embodiment, the shafts are mounted using ball bearings to minimize friction and allow the use of a minimum power DC motor to power the transport.

Figure 2:
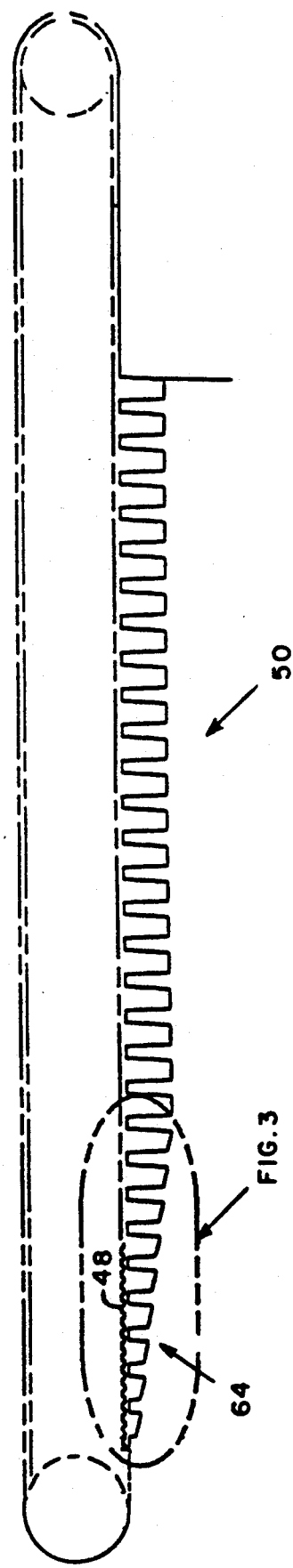
FIG. 2 is a view of the preferred embodiment of a belt for use with the belt drive of FIG. 1.

Three belts 30, 32, and 34 respectively are mounted on timing pulleys 36, 38, and 40 on shaft 16 and timing pulleys 42, 44, and 46 on shaft 18. Each of the belts, one of which is illustrated in FIG. 2, comprise a timing belt having teeth 48 on the interior and a plurality of lugs 50 over a predetermined section of the belt forming thereby a dual thickness belt having a thinner section without the lugs and a thicker section formed by the lugs. It will be appreciated that the number of belts required is dependent upon the size of the mailpieces to be accommodated.

Turning again to FIG. 1, top deck 52 having slots 54, 56, and 58 which are in substantial registration with the belts fits over the transport assembly frame 14 such that in the home position, that is with the thinner side of the belts being up, the belts 30, 32, and 34 do not protrude through the respective slots 54, 56, and 58 so as not to interfere with the weighing of an object such as a document or mailpiece placed on the top deck 52. When it is desired to transport the mailpiece from the top deck 52 to, for example, a subsequent module such as a mailing machine, the drive motor 24 is actuated to drive the belts and therefore the lugs of the belts 30, 32, and 34 which form the thicker section of the belts move to the top where they protrude through the top deck 52, thereby lifting any mailpiece on the deck 52 onto the lugs 50 and moving it as the belts continue to move.

Levelling bubble 60 is mounted in the top deck 52 to facilitate leveling of the scale. Snap grip posts, one of which is illustrated at 62, are affixed to the top deck 52. The bottom of post 62 is designed to easily snap into and out of the spider incorporated in base unit 12. The details of a preferred spider and the operation of a scale may be found in U.S. patent application Ser. Nos. 745,304 and 774,004 entitled "LOAD CELL SUPPORTING MEMBER AND WEIGHING SCALE INCORPORATING THE SAME" assigned to the assignee of the present invention and herewith specifically incorporated by reference herein.

Figure 3:
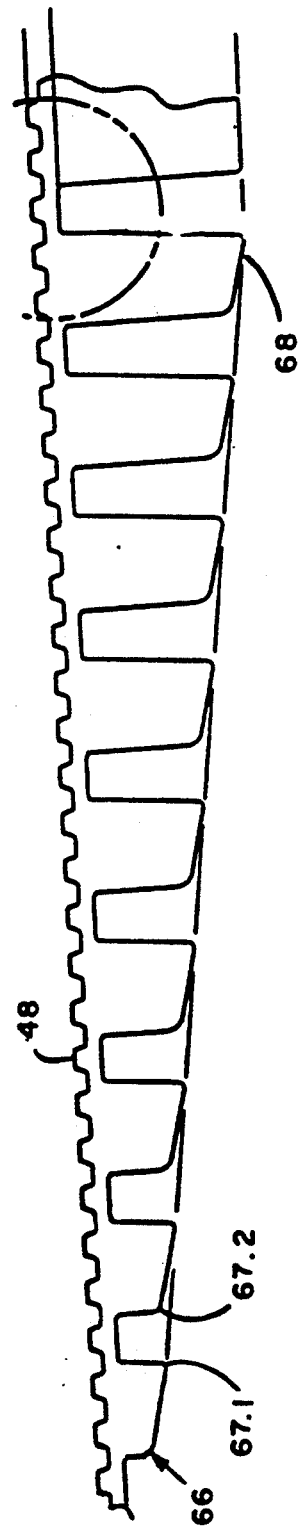
FIG. 3 is detail of the taper shown in FIG. 2.

Turning again to FIG. 2, as mentioned previously, in the home position, that is when weighing is taking place, the thin portion of each belt is uppermost as seen in the position of the belt illustrated in FIG. 2. It will be appreciated by those skilled in the art that the lugs 50 may all be of the same height, however for best results, it has been found that as illustrated in FIG. 2 and in the expanded section shown in FIG. 3, an initial group of lugs indicated generally at 64 may be tapered in height and in cross-section such that the profile of the lugs grades smoothly from lug 66, the top of which is only slightly above the surface of the thin portion of the belt, to lug 68, which is nearly the height of the remainder of the lugs 50. The lugs 64 form a tapered transition zone between the thinner and thicker sections of the belt. The tapered transition lugs serve to assure that a mailpiece is smoothly lifted from the deck 52 and is not simply pushed along by the first lug to protrude through the slot in the deck 52. In addition, it is preferable that the trail edge of a lug 67.1 (FIG. 3) is slightly above the lead edge of the following lug 67.2 further assuring that there will not be a vertical surface that strikes the trail edge of a mailpiece as the belts begin to engage with the mailpiece. It is important to smoothly start and transport the mailpiece in order not to cause it to skew.

In an alternate embodiment the zone of tapered transition lugs could be substituted with a solid tapered generally triangular member. This solid member could be formed out of any number of compliant materials for example, soft urethanes, compliant rubber or compliant foam backed materials with a skinned upper surface.

In the preferred embodiment, the belts and slots are skewed at a slight angle as seen in FIG. 1 to provide an alignment of the mailpiece as it leaves the scale. Since the belts are skewed, the mailpiece is continually urged toward the realignment wall 70 as the belts convey it toward the next module. In the preferred embodiment, the transport belt speed is about 30 inches/second (to match the velocity of the downstream mailing machine) at maximum voltage to the DC motor 24.

Figure 4:
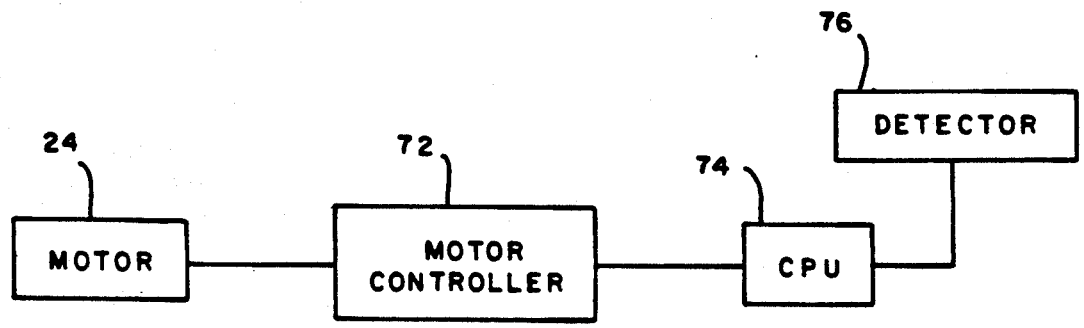
FIG. 4 is a schematic representation of the electrical connection between the CPU of the scale, the motor controller, and the motor for driving belts of the transport.

Motor controller board 72 comprises a conventional control for motors of the type known in the art connected for control of the DC motor 24 in accordance with a novel program preferably operating in conjunction with the scale CPU 74 (shown in FIG. 4) and with timing signals developed from the belt LED/Photodetector assembly shown at 76.

Figure 6:
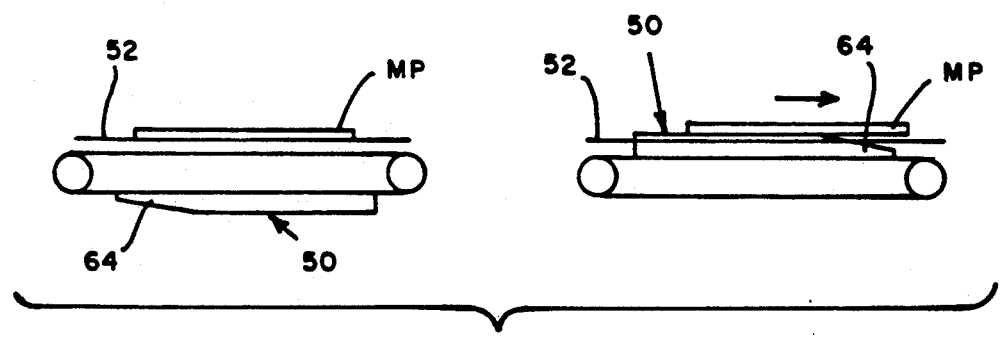
FIG. 6 is a schematic illustration of the operation of the transport system.
Figure 5:
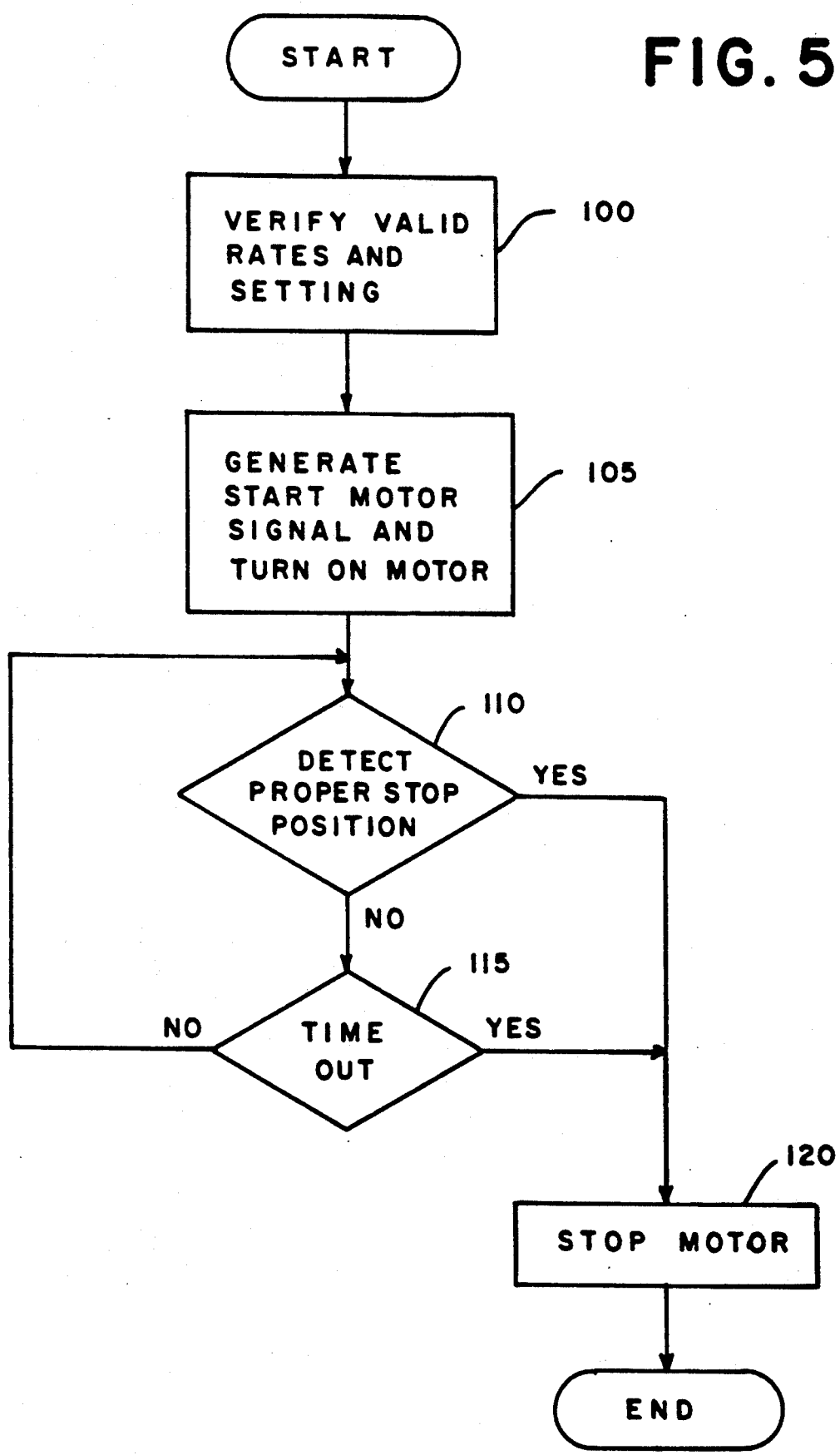
FIG. 5 is a flow chart of the operation of the transport.

FIG. 5 is a flow chart of the operation of the scale transport in accordance with the invention. With a mailpiece on deck 52, a check is made to verify valid rate selection and proper meter setting, block 100. A Start Motor signal is generated by CPU 74, block 105, and the transport motor 24 turned ON to feed the mailpiece to the next module. As seen in FIG. 6, the lugs 50 on the belt traverse the slots, lifting and transporting the mailpiece MP, in the direction of the arrow.

Returning now to FIG. 5, a check is made at decision block 110 to see whether a lug on belts 34 has been detected by photodector 76 on board 72. If the first lug has been detected, a STOP MOTOR signal is sent to the controller 72 from the CPU 74, block 120. Preferably the STOP MOTOR signal is also enabled after a time out default has occurred, decision block 115. If the condition for a time out default has not been met the system will loop back and continue further processing at block 110. The deck 52 is then ready to receive a new mailpiece. Further details of the program of operation of the transport system may be obtained from U.S. patent application Ser. No. 922,892 filed on Jul. 31, 1992, entitled "SOFTWARE CONTROL OF A WEIGH AND FEED TRANSPORT IN A SCALE", and assigned to the assignee of the present application, specifically incorporated by reference herein.

Those skilled in the art will recognize that the above descriptions and the attached drawings have been provided by way of illustration only and that numerous other embodiments of the subject invention will be apparent to those skilled in the art from consideration of the above description and the attached drawings. Accordingly limitation on the scope of the subject invention are to be found only in the claims set forth below.

What is claimed is:

1. A transport apparatus for a scale, the scale comprising a deck connected to a scale base for weighing an object placed on the deck, the deck having at least one slot therein; the transport apparatus comprising a dual thickness belt arranged below the deck in substantial registration with the slot and means for driving said dual thickness belt, the dual thickness belt being positioned with respect to the slot such that in a home position a thinner section of the belt does not protrude through the slot whereby the belt does not interfere with weighing of the object on the deck, the means for driving the dual thickness belt being operative to drive the dual thickness belt such that a thicker section of the belt protrudes through the slot as the dual thickness belt is being driven to thereby lift the object from the deck onto the thicker section of the belt to transport the object on the belt.

2. The apparatus of claim 1, wherein the thicker section of the belt comprises a plurality of lugs.

3. The apparatus of claim 2, wherein there is a tapered transition from the thinner section of the belt to the thicker section of the belt.

4. The apparatus of claim 3, wherein the tapered transition comprises a plurality of lugs tapered in height.

5. The apparatus of claim 4, wherein a transporting tapered edge of each of said lug is configured such that a lead edge of each of said lugs is below trail edge of proceeding lug to assure smooth transition.

6. The apparatus of claim 1, wherein the belt and slot are slightly skewed with respect to a realignment wall whereby the object may be aligned against the wall as the object leaves the scale.

7. A method for transporting a mailpiece from a scale deck comprising the steps of providing a plurality of slots in the deck; providing a corresponding plurality of driven dual thickness belts below the deck and in substantial registration, respectively, with the slots; weighing the mailpiece while thinner sections of the belts are in a position wherein the belts do not protrude through the slots and thereby do not interfere with the weighing step; and thereafter actuating the belts to move such that a thicker portion of the belts protrudes through the slots to lift the mailpiece and transport said mailpiece as the belts move.

8. The method of claim 7, further comprising the step of urging the mailpiece toward a realignment wall while transporting the mailpiece.

9. A weighing module comprising a scale including a deck connected to a scale base for weighing a mailpiece placed on the deck, the deck having a plurality of slots therein; a transport apparatus, the transport apparatus comprising a plurality of dual thickness belts respectively corresponding to the slots in the deck of the scale, the belts being arranged below the deck in registration with the slots; and, means for driving the belts, the belts being positioned with respect to the slots such that in a home position thinner sections of respective belts do not protrude through the slots whereby the transport means does not interfere with weighing of the mailpiece on the deck, the means for driving the belts being operative to drive the dual thickness belts such that a thicker section of the belts protrudes through the slot as the dual thickness belts are being driven to thereby lift the mailpiece from the deck onto the thicker section of the belts to transport the mailpiece on the belt.

10. The apparatus of claim 9, wherein the respective thicker sections of the belts comprise a plurality of lugs.

11. The apparatus of claim 10, wherein for each of the belts there is a tapered transition from the thinner section of each of the belts to the thicker section of each of the belts.

12. The apparatus of claim 11, wherein the tapered transition comprises a plurality of lugs tapered in height.

* * * * *